(12) United States Patent
Whitworth

(10) Patent No.: US 6,830,119 B2
(45) Date of Patent: Dec. 14, 2004

(54) NET FOR COVERING FRONT GRILL OF AUTOMOTIVE

(76) Inventor: Troy Whitworth, 3713 Aberdeen, Alton, IL (US) 62002

( * ) Notice: Subject to any disclaimer, the term of this patent is extended or adjusted under 35 U.S.C. 154(b) by 0 days.

(21) Appl. No.: 10/205,998

(22) Filed: Jul. 26, 2002

(65) Prior Publication Data

US 2004/0017072 A1 Jan. 29, 2004

(51) Int. Cl.$^7$ .............................................. B60R 19/52
(52) U.S. Cl. .................... 180/68.6; 280/770; 296/136.1; 296/136.13
(58) Field of Search ...................... 180/68.6; 280/770; 293/115; D12/181, 216, 401; 40/205, 206; 296/136.01, 136.1, 136.11, 136.03, 136.05, 136.06, 136.07, 136.08, 136.09, 136.12, 136.13

(56) References Cited

U.S. PATENT DOCUMENTS

| 1,054,592 | A | | 2/1913 | Miller | |
|---|---|---|---|---|---|
| RE13,916 | E | | 5/1915 | Miller | |
| 1,295,629 | A | | 2/1919 | Stewart | |
| 1,706,447 | A | * | 3/1929 | Goodykoontz | 180/68.6 |
| D97,232 | S | | 10/1935 | Kaemmer | |
| 2,020,838 | A | | 11/1935 | Kaemmer | 257/132 |
| 2,034,493 | A | * | 3/1936 | Sonnenberg | 293/41 |
| 2,053,576 | A | | 9/1936 | Osten | 257/132 |
| D101,669 | S | | 10/1936 | Glassberg | |
| D103,172 | S | | 2/1937 | Wengard | |
| 2,070,919 | A | | 2/1937 | Posey | 257/132 |
| D109,525 | S | * | 5/1938 | Wengard | D12/216 |
| 2,778,439 | A | * | 1/1957 | Pfingsten | 180/68.6 |
| 2,868,308 | A | * | 1/1959 | Biewald | 180/68.6 |
| 3,763,908 | A | * | 10/1973 | Norman | 150/166 |
| 3,831,696 | A | * | 8/1974 | Mittendorf et al. | 180/68.6 |
| 4,085,964 | A | * | 4/1978 | Hutto et al. | 296/91 |
| 4,236,592 | A | * | 12/1980 | Ziegler | 180/68.6 |
| 4,376,546 | A | * | 3/1983 | Guccione et al. | 280/770 |
| 4,750,549 | A | | 6/1988 | Ziegler et al. | 165/98 |
| 4,889,171 | A | * | 12/1989 | Minimo | 150/166 |
| 4,951,993 | A | * | 8/1990 | Taboada | 296/136.13 |
| 4,997,229 | A | | 3/1991 | Swanson | 296/136 |
| 5,056,817 | A | * | 10/1991 | Fuller | 280/770 |
| 5,129,678 | A | | 7/1992 | Gurbacki | 280/770 |
| 5,158,324 | A | * | 10/1992 | Flesher | 280/770 |
| 5,176,421 | A | * | 1/1993 | Fasiska | 296/136.03 |
| 5,244,245 | A | * | 9/1993 | Kashino | 296/136.11 |
| 5,381,618 | A | * | 1/1995 | Singleton | 40/202 |
| 5,401,074 | A | * | 3/1995 | Timerman | 296/136.02 |
| 5,409,286 | A | * | 4/1995 | Huang | 296/136.04 |
| D364,846 | S | * | 12/1995 | Kelsey et al. | D12/401 |
| 5,516,181 | A | * | 5/1996 | Thompson | 296/98 |
| D400,842 | S | * | 11/1998 | Davis et al. | D12/216 |
| D400,845 | S | * | 11/1998 | Miller et al. | D12/401 |
| D402,622 | S | * | 12/1998 | Rogers | D12/401 |
| D425,010 | S | * | 5/2000 | Lowe | D12/216 |
| 6,092,857 | A | * | 7/2000 | Rivas | 296/136.04 |
| 6,220,648 | B1 | * | 4/2001 | Daniel | 296/136.02 |
| 6,309,076 | B1 | * | 10/2001 | McVicker | 359/601 |

FOREIGN PATENT DOCUMENTS

GB             278537         10/1927

* cited by examiner

*Primary Examiner*—Christopher P. Ellis
*Assistant Examiner*—Kelly E Campbell
(74) *Attorney, Agent, or Firm*—Walter J. Tencza, Jr.

(57) ABSTRACT

An apparatus is provided comprising a net, which can be attached to an automobile so that the net covers a substantial portion of a front grill of the automobile to prevent insects or debris from entering the front grill. A first side of the net may be attached to a hood of the automobile and a second side of the net may be attached to a front license plate of the automobile. The net may be attached to a pocket section, and the net can be detached from the automobile and rolled up into the pocket section. The net may be attached to a material having substantially the size and shape of a license plate. The net may flare outward from a first side attached to the material to a second side, which is opposite the first side.

13 Claims, 7 Drawing Sheets

US 6,830,119 B2

NET FOR COVERING FRONT GRILL OF AUTOMOTIVE

FIELD OF THE INVENTION

This invention relates to improved methods and apparatus concerning preventing insects or other debris from entering parts of an automobile.

BACKGROUND OF THE INVENTION

Insects flying into and other debris entering the front grill region of an automobile can damage the automobile. There are no adequate methods or apparatus for protecting an automobile from such damage.

SUMMARY OF THE INVENTION

The present invention in one or more embodiments provides a method and an apparatus for protecting an automobile from damage from insects or other debris entering a front grill of the automobile.

An apparatus is provided comprising a net, which can be attached to the automobile so that the net covers a substantial portion of the front grill of the automobile. The net may be attached at its first end underneath a hood of the automobile and at its second end to a front license plate of the automobile. The net may be attached to a pocket section, and the net can be detached from the automobile and rolled up into the pocket section. The net may be attached to a material having substantially the size and shape of a license plate. The net may flare outward from a first side or end attached to the material to a second side or end, which is opposite the first side or end.

The apparatus may be further comprised of a first cord, which may pass through a first sleeve of the net, and a second cord, which may pass through a second sleeve of the net. The first and second sleeves of the net may be located on opposite sides the net.

The present invention in one or more embodiments provides a method including the step of attaching a net to an automobile so that the net covers a substantial portion of a front grill of the automobile.

DETAILED DESCRIPTION OF THE DRAWINGS

Figure 1:
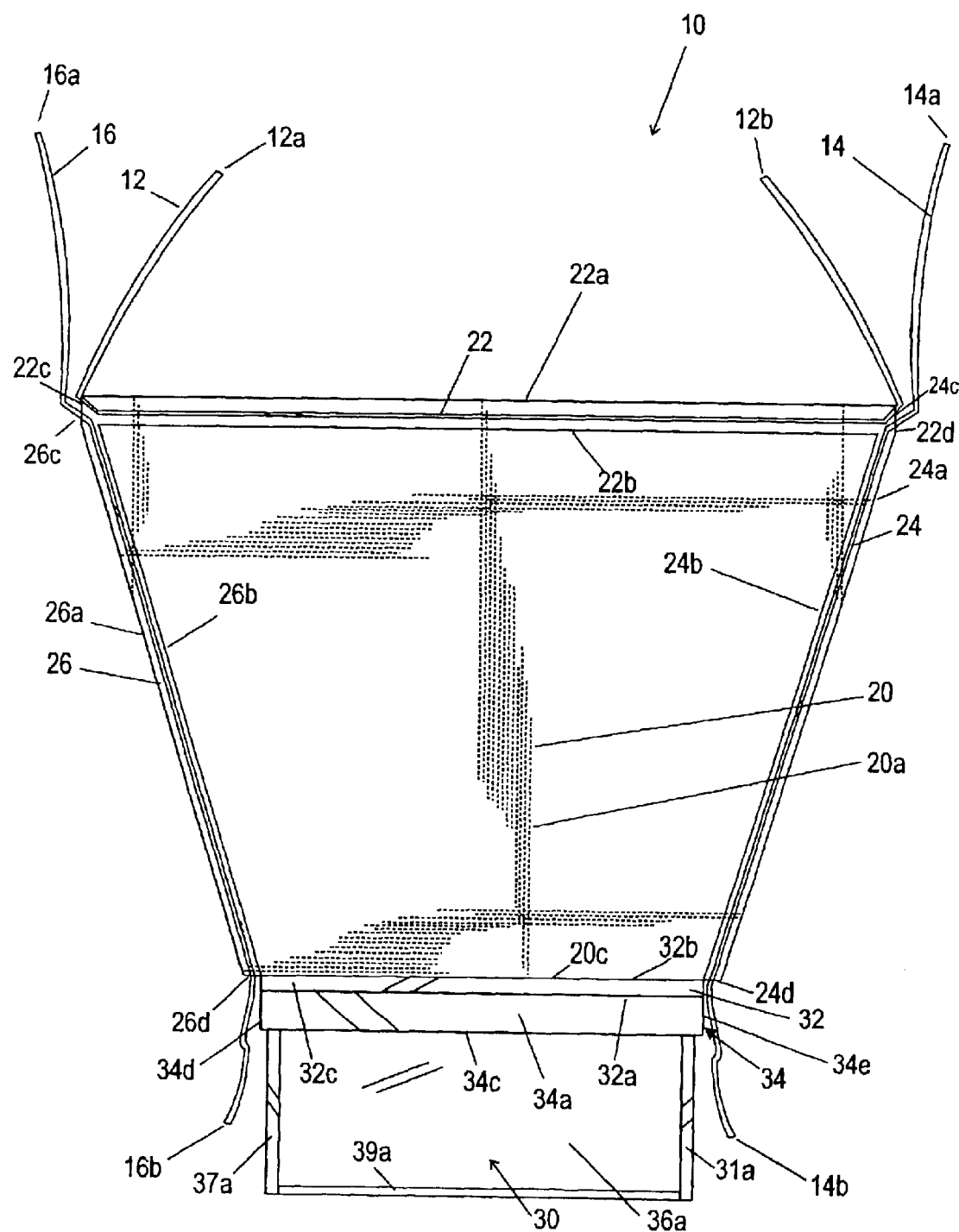
FIG. 1 shows a front view of an apparatus in accordance with a first embodiment of the present invention with a pocket section shown in a closed state.
Figure 2:
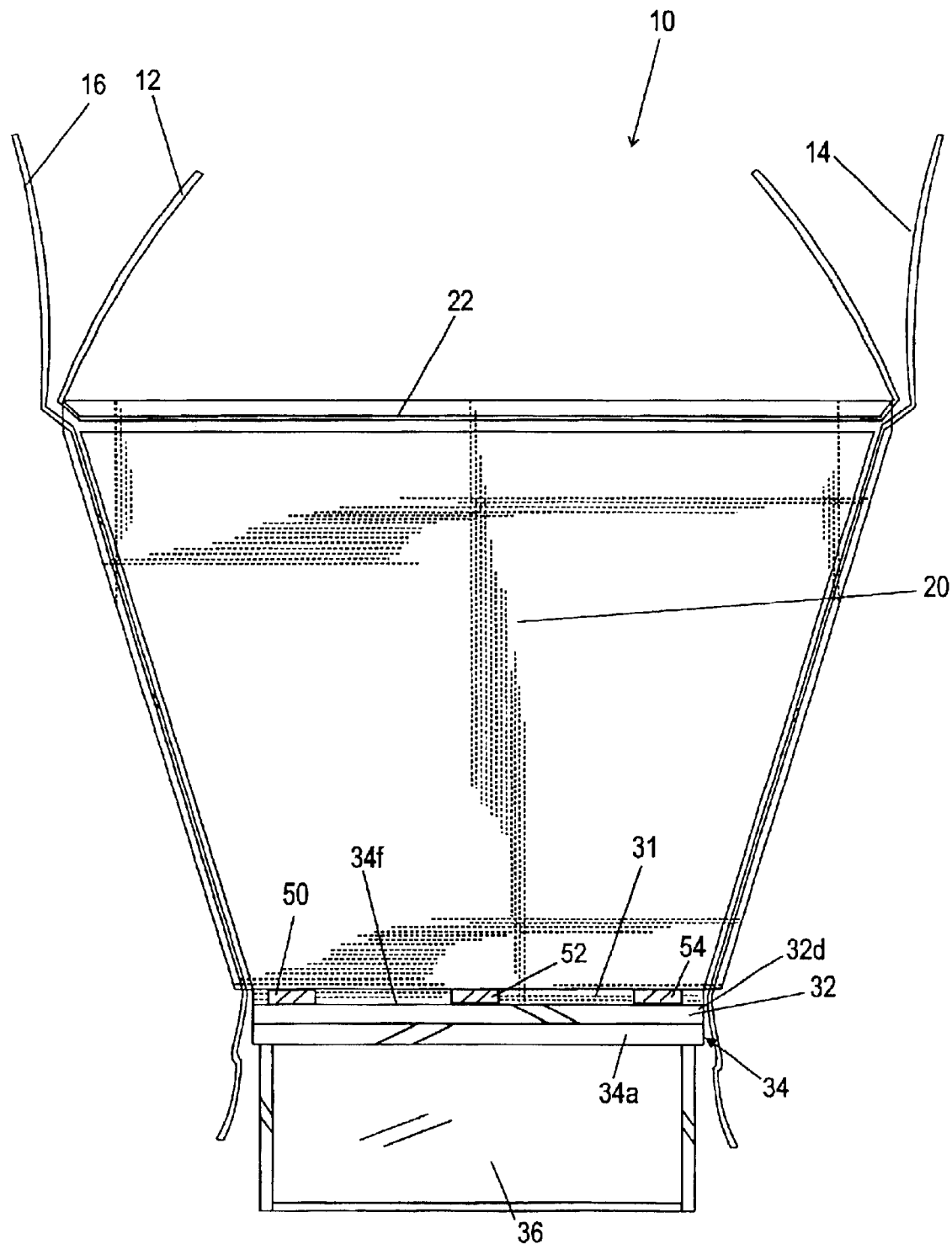
FIG. 2 shows a front view of the apparatus of FIG. 1 with the pocket section shown in an open state.
Figure 3:
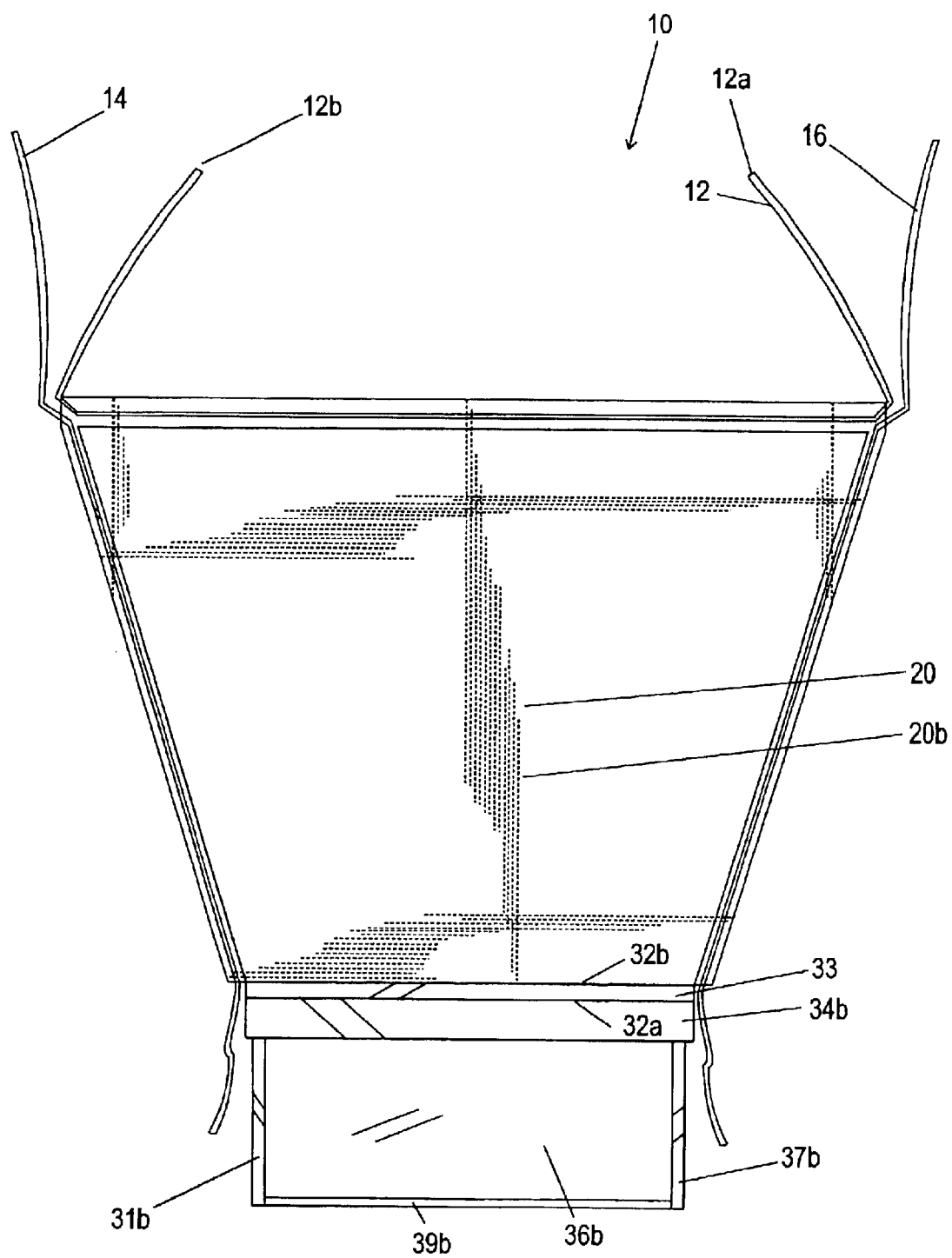
FIG. 3 shows a rear view of the apparatus of FIG. 1.

FIG. 1 shows a front view of an apparatus 10 in accordance with a first embodiment of the present invention with a pocket section 34 shown in a closed state. FIG. 2 shows a front view of the apparatus 10 of FIG. 1 with the pocket section 34 shown in an open state. FIG. 3 shows a rear view of the apparatus 10 of FIG. 1. The apparatus 10 includes a net 20, cords 12, 14, and 16, a license plate section or material 30, and the pocket section 34.

The net 20 may extend from vertically from side or stitching 22a to side or stitching 20c and horizontally from side or stitching 26a to side or stitching 24a. The net 20 includes sleeves 22, 24, and 26. Cords 12, 14, and 16 pass through sleeves 22, 24, and 26, respectively. Sleeve 22 may be bound by stitches 22a and 22b and may have a left open-end 22c and a right open end 22d. Sleeve 24 may be bound by stitches 24a and 24b and may have a top open-end 24c and a bottom open-end 24d. Sleeve 26 may be bound by stitches 26a and 26b and may have a top open-end 26c and a bottom open-end 26d. Cord 12 may have an end 12b which comes out of end 22d of the sleeve 22 and an end 12a which comes out of the end 22c of the sleeve 22. Cord 14 may have an end 14a, which comes out of end 24c of sleeve 24, and an end 14b, which comes out of end 24d of sleeve 24. Cord 16 may have and end 16a, which comes out of end 26c of sleeve 26 and an end 16b, which comes out of end 26d of sleeve 26.

The pocket section 34 is comprised of a flap 32, an attachment device base 31 shown in FIG. 2, a pocket front portion 34a shown in FIG. 1, and a pocket rear portion 34b shown in FIG. 3. The pocket section 34 has a closed bottom 34c, a closed left side 34d, and a closed right side 34e. The pocket section 34 has a top side 34f, which is open when the flap 32 is detached from the attachment devices 50, 52, and 54 of FIG. 2. The closed bottom 34c, closed left side 34d, closed right side 34e, and open top side 34f form a pocket for inserting the rolled up net 20 and cords 12, 14, and 16 when the net 20 is not being used.

Side 20c of the net 20 is attached to the attachment device base 31 shown in FIG. 2. The attachment device base 31 has attached thereto, attachment devices 50, 52, and 54. The attachment devices 50, 52, and 54 may each be a rectangular section of Velcro (trademarked), i.e. one of either hooks or loops. The flap 32 may have an exterior portion 32c shown in FIG. 1 and an interior portion 32d shown in FIG. 2. The interior portion 32d may be comprised of Velcro (trademarked), i.e. loops or hooks, for attaching to the attachment devices 50, 52, and 54. Typically if the devices 50, 52, and 54 are hooks, then the interior portion 32d will be comprised of loops, or vice versa. The closed bottom 34c of the pocket section 34 may be connected to the license plate section 30.

The license plate section 30 may include front seam portions 37a, 39a, and 31a shown in FIG. 1 and rear seam portions 31b, 37b, and 39b shown in FIG. 3. The license plate section 30 may have four pre-drilled holes corresponding to the location of four license plate screws on a typical automobile.

Figure 4:
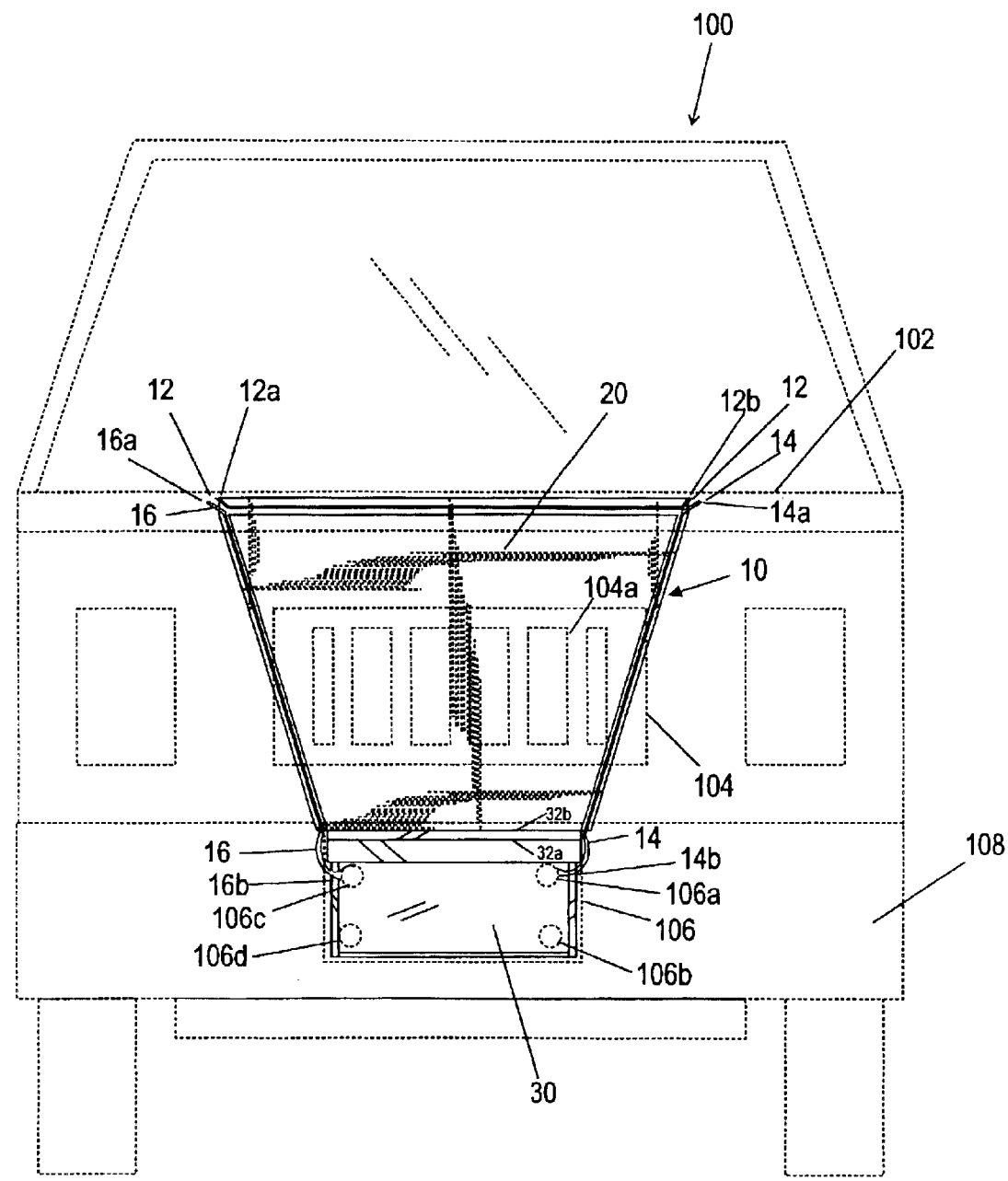
FIG. 4 shows a front view of a portion of the apparatus of FIG. 1, with the apparatus attached to an automobile.

FIG. 4 shows a front view of the apparatus 10 of FIG. 1, with the apparatus 10 attached to an automobile 100. The automobile 100 includes a hood 102, a front grill 104, a front license plate 106, and a front bumper 108.

In operation, the apparatus 10 is attached to the automobile 100 in the following manner. Ends 12a and 16a of cords 12 and 16 respectively, are attached or tied to screws or nuts underneath the hood 102 on the left side of the automobile 100. Ends 12b and 14a of cords 12 and 14 are attached or tied to screws or nuts on the right side of the automobile 100. End 16b of cord 16 is attached or tied to screw 106c, which is screwed into the bumper 108 through license plate 106 and through license plate portion 30 of the apparatus 10. The license plate section 30 of the present invention would typically lie beneath the front license plate 106 of the automobile 100 and beneath the heads of screws 106a, 106b, 106c, and 106d, so that the license plate 106 can be seen from the front view of the automobile 100. End 14b of the cord 14 is attached or tied to screw 106a, which is screwed into the bumper 108 through license plate 106 and through license plate section 30 of the apparatus 10. The license plate portion 30 may be also be held by screws 106d and 106b, which may be inserted through license plate 106, then through license plate portion 30 and then into bumper 108. The license plate section 30 of the apparatus 10 may have pre-drilled holes for inserting screws 106a, 106b, 106c, and 106d.

The automobile 100 is shown in dashed lines so that the location of the apparatus 10 can be easily seen. The apparatus 10 is situated so that the net 20 can be seen from a front view of the automobile 100 and so that the net 20 covers all or substantially all of the slots, such as slot 104a of the grill 104. The spacing in the net 20 is small enough so that a typical insect, such as a mosquito, cannot pass through the net 20 and thus cannot enter the grill 104 or enter the automobile 100 through the grill 104. The spacing in the net 20 may be one sixteenth of an inch or less.

Figure 5:
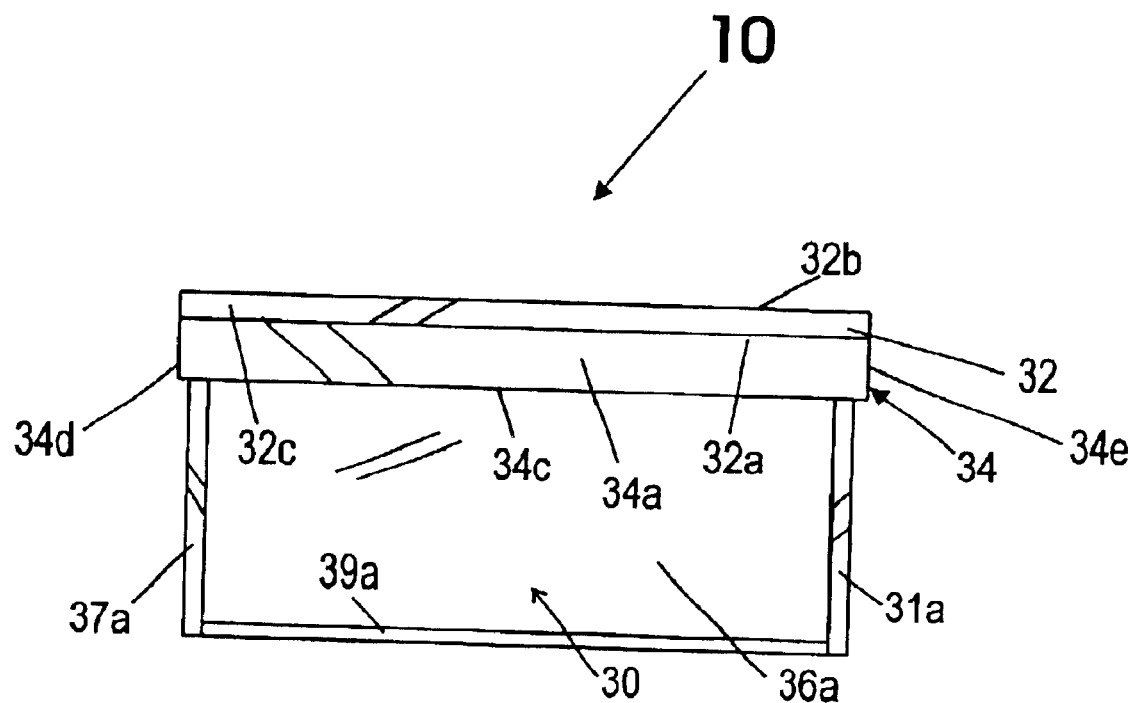
FIG. 5 shows a front view of the apparatus of FIG. 1 with the pocket section in a closed state and after a net of the apparatus has been rolled up and inserted into the pocket section.

FIG. 5 shows a front view of the apparatus 10 of FIG. 1 with the pocket section 34 in a closed state and after the net 20 of the apparatus 10 has been rolled up and inserted into the pocket section 34. In FIG. 5 the flap 32 has been closed onto the attachment devices 50, 52, and 54 so that the flap portion side 32d comprised of Velcro (trademarked), i.e. hooks or loops, is attached to the attachment devices 50, 52, and 54. End 26c and end 24c can be folded onto the middle of side 22a and then the net 20 and cords 12, 14, and 16 can be rolled up tightly and inserted into the pocket defined by sides 34d and 34e and bottom 34c.

Figure 6:
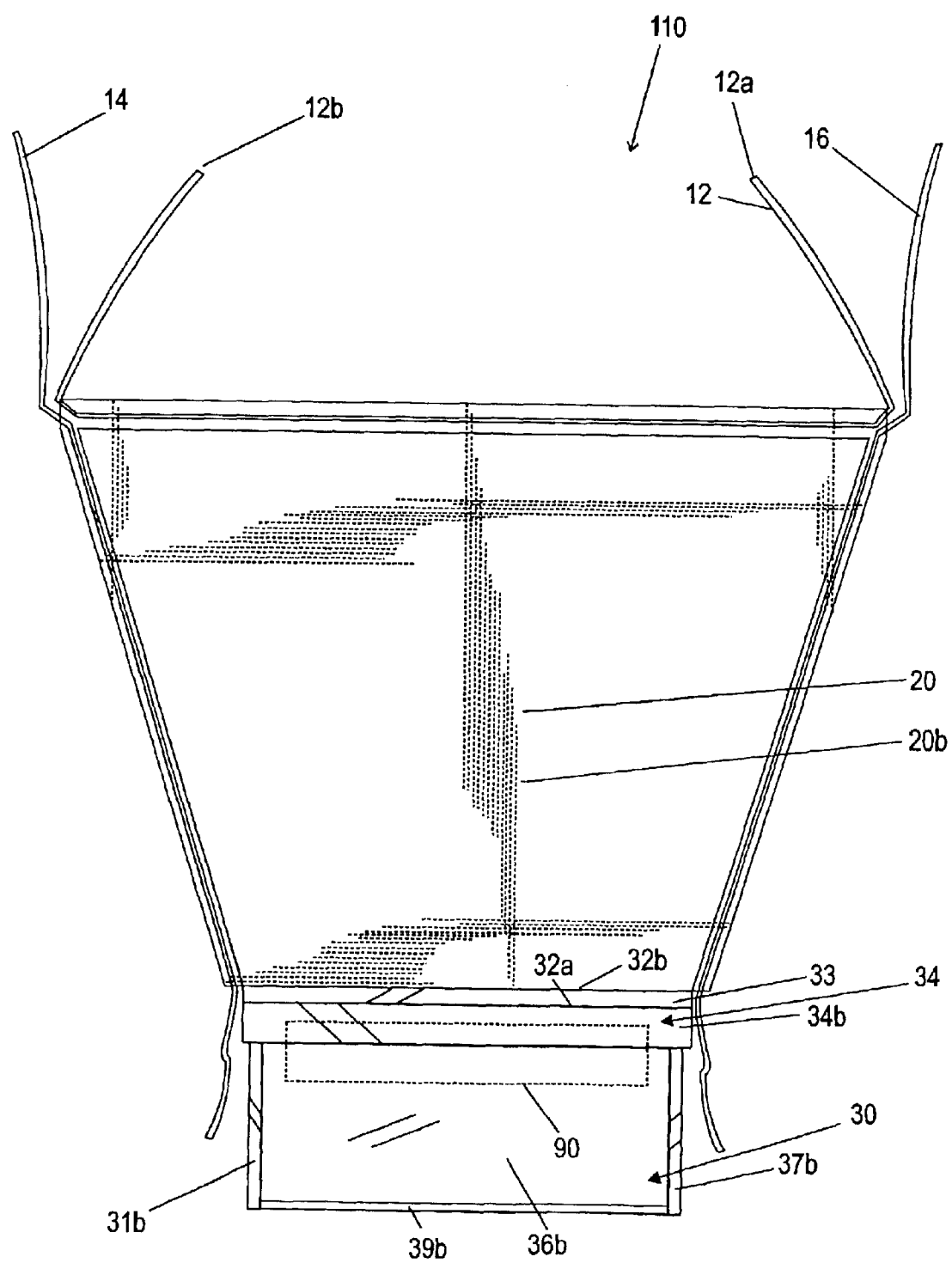
FIG. 6 shows a rear view of an apparatus of another embodiment of the present invention including a support plate.

FIG. 6 shows a rear view of an apparatus 10 of another embodiment of the present invention including a support plate 90. The support plate 90 is shown in dashed lines, and may be sewn into portions of the license plate portion 30 and the pocket section 34 at the rear of the apparatus 110. Other than the support plate 90 and any material needed to attach the support plate 90 to the license plate portion 30 and the pocket section 34, the apparatus 110 is the same as the apparatus 10. The support plate 90 may be made of a stiff, rigid material, such as a stiff rigid plastic. The support plate 90 should substantially prevent the pocket section 34 from drooping over the license plate portion 30.

Figure 7:
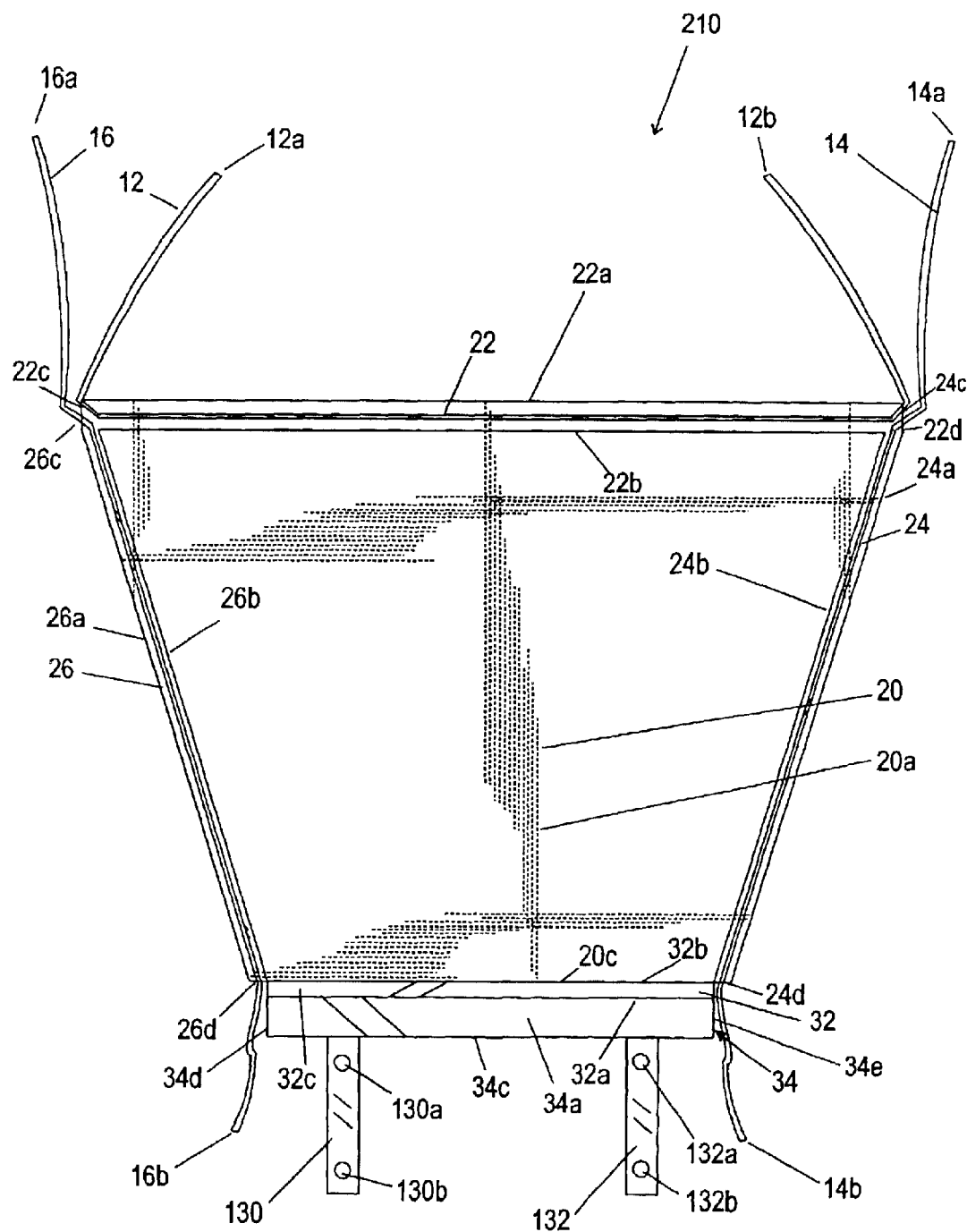
FIG. 7 shows a front view of an apparatus of another embodiment of the present invention including bands or strips of material for attaching to a license plate.

FIG. 7 shows a front view of an apparatus 210 of another embodiment of the present invention including bands or strips of material 130 and 132 for attaching to a license plate. The bands 130 and 132 in the apparatus 210 are used instead of the license plate portion 30 of the embodiments of FIGS. 1–6. The apparatus 210 may be otherwise similar to apparatus 10 of FIGS. 1–5. The bands 130 and 132 have holes 130a–b and 132a–b, which are located so as to substantially coincide with the locations of screws or bolts, which typically attach a standard license plate to an automobile. The license plate portion 30 of FIGS. 1–5 may have similar holes located at similar locations for attaching the license plate portion 30 along with a standard license plate to an automobile. The bands 130 and 132 may each be a stiff, rigid metal band.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:

an automobile having a front grill and a hood;

a license plate connected to the automobile, wherein the license plate has a top side and a bottom side opposite the top side, wherein the top side of the license plate is closer to the hood than the bottom side of the license plate;

a net attached to the automobile so that the net covers a substantial portion of the front grill of the automobile;

and a license plate portion having a top side and a bottom side;

wherein the license plate portion is connected to the license plate, so that the top side of the license plate portion is closer to the hood than the bottom side of the license plate portion;

wherein the license plate portion is connected to the license plate and to the automobile by one or more fasteners which are inserted through the license plate portion and through the license plate; and wherein the net is attached to the license plate portion at the top side of the license plate portion;

wherein the net is attached to a pocket section, and the net can be detached from the automobile and rolled up into the pocket section; and wherein the license plate portion includes the pocket section.

2. The apparatus of claim 1 wherein the license plate portion is about the same size as the license plate.

3. The apparatus of claim 2 wherein the net is comprised of a top side and a bottom side;

the net is attached at its top side to the hood of the automobile and at its bottom side to the front license plate of the automobile.

4. The apparatus of claim 1 wherein the license plate portion is about the same size as the license plate.

5. An apparatus comprising:

a net comprised of a top side a bottom side which is substantially opposite the top side, a left side, and a right side which is substantially opposite the left side; and a material having substantially the size of a license plate;

wherein the net is attached to the material; and wherein the net can be attached to an automobile so that the net covers a substantial portion of a front grill of the automobile, while the material is substantially aligned with the license plate;

wherein the material has a top side and a bottom side;

wherein the material can be connected to the license plate, so that the top side of the material is closer to a hood of the automobile than the bottom side of the material, while the net covers a substantial portion or the front grill of the automobile;

wherein the material has one or more openings through which one or more corresponding fasteners can be inserted to connect the material to the license plate and to the automobile; and wherein the bottom side of the net is attached to the top side of the material;

wherein the net is attached to a pocket section, and the net can be detached from the automobile and rolled up into the pocket section; and wherein the material includes the pocket section.

6. The apparatus of claim 5 wherein the net flares outward from the bottom side of the net to the top side of the net.

7. The apparatus of claim 6 further comprising a first cord; and wherein the net has a first sleeve through which the first cord can pass and the first sleeve runs from the bottom side of the net to the top side of the net.

8. The apparatus of claim 5 further comprising a first cord; and wherein the net has a first sleeve through which the first cord can pass.

9. The apparatus of claim 8 further comprising a second cord; and wherein the net has a second sleeve through which the second cord can pass;

the first sleeve being located on the left side of the net and the second sleeve being located on the right side of the net.

10. The apparatus of claim 9 wherein the net flares outward from the bottom side of the net to the top side of the net.

11. A method comprising the step of:

attaching a net and a material to an automobile so that the net covers a substantial portion of the front grill of the automobile, while the material is substantially aligned with a license plate of the automobile;

wherein the net is comprised of a top side, a bottom side which is substantially opposite the top side, a left side, and a right side which is substantially opposite the left side; and the material has substantially the size of the license plate;

wherein the net is attached to the material; and wherein the material has a top side and a bottom side;

wherein the material can be connected to the license plate, so that the top side of the material is closer to a hood of the automobile than the bottom side of the material, while the net covers a substantial portion of the front grill of the automobile;

wherein the material has one or more openings through which one or more corresponding fasteners can be inserted to connect the material to the license plate and to the automobile; and wherein the bottom side of the net is attached to the top side of the material; and wherein the net is attached to a pocket section, and further comprising detaching the net from the automobile and rolling the net up into the pocket section; and wherein the material includes pocket section.

12. The method of claim 11 wherein and the net is attached to the front license plate of the automobile.

13. The method of claim 12 further comprising attaching the top side of the net to a hood of the automobile; and attaching the bottom side of the net to the front license plate of the automobile.

* * * * *